(12) United States Patent
Milencovici et al.

(10) Patent No.: US 9,116,972 B2
(45) Date of Patent: Aug. 25, 2015

(54) INFORMATION SYNCHRONISATION

(75) Inventors: Tudor Milencovici, Steinheim (DE); Bruno Jouhier, Paris (FR)

(73) Assignee: Sage Technologies Limited, Dublin (IE)

( * ) Notice: Subject to any disclaimer, the term of this patent is extended or adjusted under 35 U.S.C. 154(b) by 632 days.

(21) Appl. No.: 12/249,365

(22) Filed: Oct. 10, 2008

(65) Prior Publication Data

US 2010/0070470 A1  Mar. 18, 2010

(30) Foreign Application Priority Data

Sep. 17, 2008  (GB) .................................. 0817022.7

(51) Int. Cl.
*G06F 17/30* (2006.01)
(52) U.S. Cl.
CPC .................. *G06F 17/30578* (2013.01)
(58) Field of Classification Search
USPC .................................. 707/638, 610
See application file for complete search history.

(56) References Cited

U.S. PATENT DOCUMENTS

| 6,574,665 | B1 | 6/2003 | Khotimsky |
| 6,640,230 | B1 * | 10/2003 | Alexander et al. ..................... 1/1 |
| 7,359,920 | B1 * | 4/2008 | Rybicki et al. ................ 707/617 |

| 2006/0288053 | A1 | 12/2006 | Holt et al. |
| 2007/0282915 | A1 | 12/2007 | Vosshall et al. |
| 2009/0006498 | A1 | 1/2009 | Freedman |

FOREIGN PATENT DOCUMENTS

| EP | 0974895 | 1/2000 |
| WO | WO-2005024552 | 3/2005 |

OTHER PUBLICATIONS

European Search Report and accompanying examination report in EP 09152079.1, issued Jan. 12, 2010.
Chengzhen Sun et al., "Capturing Causality by Compressed Vector Clock in Real-Time Group Editors," Proc. Int'l Parallel and Dist'd Processing Symposium, IPDPS 2002, pp. 558-565, Apr. 15, 2002.
Albert Benveniste et al., "Heterogeneous Reactive Systems Modeling: Capturing Causality and the Correctness of Loosely Time Triggered Architectures (LTTA)," EMSOFT 2004, 4th ACM Int'l Conf. on Embedded Software, pp. 220-229, Sep. 27, 2004.
M. Raynal et al., "Capturing Causality in Distributed Systems," IEEE Computer, vol. 29, No. 2, pp. 49-56, Feb. 1996.
UK Search Report issued in corresponding UK Application No. GB0817022.7 on Jan. 23, 2009.

* cited by examiner

*Primary Examiner* — Alex Gofman
(74) *Attorney, Agent, or Firm* — Panitch Schwarze Belisario & Nadel LLP (57) ABSTRACT

A technique for synchronizing instances of sets of information stored on different devices may involve comparison of update digests of the different instances and comparisons of version data of information within the different instances of the sets to determine what information may need to be updated and in which of the instances.

21 Claims, 4 Drawing Sheets

The following variant is also possible:

INFORMATION SYNCHRONISATION

This application claims priority from Great Britain Application Serial No. 0817022.7, filed Sep. 17, 2008, the entire disclosure of which is incorporated herein by reference.

BACKGROUND

1. Technical Field

This invention relates to a method and apparatus for synchronising information across a set of computer applications.

Information used in a computer application can take many forms, with an example being financial or accounting data. The information may be sales order information, invoice information, stock information or any of the other types of financial information that is used.

Each information entry is referred to as an object and objects are stored in data stores.

A problem is encountered when objects that are replicated across several data stores are modified. The ideal situation is that any modification is instantaneously reflected across all replicas such that the information is up-to-date everywhere. Due to objective constraints such as connection reliability and latency, resilience or the desire to keep objects highly available, it is not practicable (and in most cases not necessary) to keep the whole network of applications up-to-date all the time.

It is therefore considered that the applications interact and exchange information with the aim of achieving a consistent underlying content. This interaction is called synchronisation.

2. Description of Related Art

An existing method for synchronising data uses vector clock synchronisation, which uses an algorithm for generating a partial ordering of events in a distributed system and detecting causality violations. Interprocess messages contain the state of the sending process's logical clock. A vector clock of a system of N processes is an array of N logical clocks, one per process, a local copy of which is kept in each process with the following rules for clock updates.

Initially all clocks are zero.

Each time a process experiences an internal event, it increments its own logical clock in the vector by one.

Each time a process prepares to send a message, it sends its entire vector along with the message being sent.

Each time a process receives a message, it compares the vector clock included in the message with its own vector clock. If the vector clock included in the message is strictly greater than the vector clock of the process, the process accepts the new state contained in the message and replaces its vector clock by the vector clock contained in the message. If the vector clock included in the message is strictly smaller than the vector clock of the process, the process ignores the message. If the two vector clocks are not comparable (each one has an entry that it strictly greater than the corresponding entry in the other one), the receiving process signals a conflict and applies a conflict handling rule to update its state.

The vector clock is attached to each object in a data store. Synchronisation is achieved by using the algorithm outlined above.

It is an object of the present invention to provide a more efficient method of synchronising data sets.

SUMMARY OF THE INVENTION

According to the present invention there is provided an apparatus and method as set forth in the appended claims. Other features of the invention will be apparent from the dependent claims, and the description which follows.

According to a first aspect of the present invention there is provided a method of synchronising at least first and second instances of an information set comprising a plurality of entries, wherein said first and second instances are located on different nodes of a system, the method comprising:

attaching a node value and current logical clock value pair to each entry in the information set of a given instance when said entry in the given instance is changed;

generating a digest for each of the at least first and second instances of the information set, wherein said digests comprise logical clock information of a last synchronisation event of one of the at least first and second instances with another of the at least first and second instances of the information set; and synchronising the at least first and second instances of the information set by comparing the digests and reconciling the at least first and second instances.

Preferably, an existing node value and current logical clock value pair of an entry is deleted and replaced with a new node value and current logical clock value pair when said entry is changed.

A timestamp value may be attached to each data entry when said entry is changed, in addition to the node value and current logical clock value pair.

The current logical clock value may be referred to as a tick.

Preferably, the synchronisation is performed in a bi-directional manner, for example from the first instance to the second instance and then from the second instance to the first instance.

Preferably, synchronisation is performed for one information set at a time. This feature is advantageous over performing synchronisation one data entry at a time.

Each digest is preferably located at a node to which it relates.

The digest may comprise a node value and logical clock value pair for each node of the system.

The digest may additionally include a conflict priority value for each node of the system.

The node value and current logical clock value pair and/or the digest may be carried by a data feed or syndication feed, such as an RSS feed or an Atom feed.

The nodes may be endpoints that carry one instance of the information set. The node values may be URLs.

Two digests may be provided for each synchronisation event, which digests may be floor and ceiling digests, corresponding to a state of a node before a modification event and after a modification event respectively The invention extends to a synchronisation device operable to perform the method of the above aspect.

The synchronisation device may be an application running on a computer system.

According to another aspect of the invention there is provided a computing system comprising a plurality of nodes, wherein each node incorporates an instance of an information set, the computing system being operable to synchronise the instances of the information set, and comprising at least one synchronisation logic means operable to attach a node value and current logical clock value pair to each entry in the information set of a given instance when said entry in the given instance is changed;

generate a digest for each of the instances of the information set, wherein said digests comprise logical clock information of a last synchronisation event of one of the instances with another of the at least instances of the information set; and synchronise the instances of the information set by comparing the digests and reconciling the at least first and second instances.

The synchronisation logic means may comprise a synchronisation endpoint, which may be an interface or service, for each node or for each instance of the information set.

The synchronisation logic means may comprise one or more synchronisation engines. The synchronisation engines may be operable to drive exchanges of messages between synchronisation endpoints. The synchronisation engines and synchronisation endpoints may reside on different computers. Alternatively, a synchronisation engine may reside on the same computer as a synchronisation endpoint.

Each synchronisation endpoint is preferably operable to perform the attaching and digest generation for its given node.

Preferably, the synchronisation engines are operable to communicate with endpoints to perform the synchronisation function.

The nodes may be computer applications running on one computer or may be applications running on different computers.

According to another aspect of the invention there is provided a computer program product comprising instructions, which when run on a computer are operable to implement a method of synchronising at least first and second instances of an information set comprising a plurality of entries, wherein said first and second instances are located on different nodes of a computer system, the method comprising:

attaching a node value and current logical clock value pair to each entry in the information set of a given instance when said entry in the given instance is changed;

generating a digest for each of the at least first and second instances of the information set, wherein said digests comprise logical clock information of a last synchronisation event of one of the at least first and second instances with another of the at least first and second instances of the information set; and synchronising the at least first and second instances of the information set by comparing the digests and reconciling the at least first and second instances.

BRIEF DESCRIPTION OF THE DRAWINGS

For a better understanding of the invention, and to show how exemplary embodiments may be carried into effect, reference will now be made to the accompanying drawings in which.

In order to address the problems relating to synchronisation referred to above various attributes for a synchronisation scheme have been identified.

The solution should conform to the necessities of the various use cases arising in practice.

Some of the beneficial attributes are as follows.

Given sufficient interactions between applications and in the absence of modifications, a synchronised state between data stores should be achieved.

The scheme should support casual node interaction.

The system used should allow for implementation that is topology independent.

The scheme should offer robustness and consistency.

The scheme should offer bi-directional synchronisation.

The scheme should handle conflicts between the states of objects in an algorithmic and rigorous manner.

The scheme should contain a solution for error logging and handling.

The scheme should support catch-up and immediate synchronisation scenarios.

The scheme should offer location independence for a synchronisation engine.

The scheme should offer partial synchronisation support.

Full resynchronisation ability should be possible.

Simple implementation should be achievable.

DETAILED DESCRIPTION OF THE EXEMPLARY EMBODIMENTS

A scheme has been developed for providing synchronisation of information sets that takes into account the objectives set out above.

1.1 Vector Clock Synchronisation

A synchronisation protocol is based on "vector clock" synchronisation the well know technique referred to above and used by several synchronisation/replication systems: P2P networks, replicated file systems, etc.

Vector clocks provide an elegant solution to the problem of maintaining several copies of a given object in synchronisation and detecting conflicts.

Assuming that a given object O is replicated on several nodes N1, N2 . . . , in a system of connected computing applications the vector clocks are constructed as follows:

Every node maintains a "logical clock": C1 on N1, C2 on N2, etc.

Every node increments its own clock tick when O is modified.

A vector clock for O is a list of pairs (N1 T1), (N2 T2), . . . where T1 is the C1 tick when O was last modified on N1, T2 is the C2 tick when O was last modified on N2, etc. If O was never modified on Ni, its vector clock does not contain any pair for Ni.

O may have different vector clocks at different nodes. The goal of the synchronisation system is to bring O in synchronisation across nodes. When O is fully synchronised, its vector clock is the same on all nodes.

By comparing the vectors clocks of O on two nodes, the synchronisation algorithm can decide if the versions can be brought in synchronisation (and how) or if there is a conflict. The following table explains how this comparison works ($VO_j$ stands for the vector clock of O at node j):

| Case | Example | State | Action |
|---|---|---|---|
| VO1 = VO2 | VO1 = (N1 5)(N2 7)(N3 8)<br>VO2 = (N1 5)(N2 7)(N3 8) | N1 and N2 have the same version of O. | None |

| Case | Example | State | Action |
|---|---|---|---|
| VO1 < VO2 | VO1 = (N1 5)(N2 7)(N3 8)<br>VO2 = (N1 5)(N2 8)(N3 8) | N1's version of O is an ancestor of N2's version. | Replace N1's version of O by N2's version |
| VO1 > VO2 | VO1 = (N1 6)(N2 7)(N3 9)<br>VO2 = (N1 5)(N2 7)(N3 8) | N2's version of O is an ancestor of N1's version. | Replace N2's version of O by N1's version |
| Not comparable | VO1 = (N1 6)(N2 7)(N3 9)<br>VO2 = (N1 5)(N2 8)(N3 8) | N1 and N2 have a common ancestor but are on different branches | Conflict. Use an arbitrary rule to decide which side wins. |

This synchronisation scheme has interesting properties:

It is a distributed algorithm. Every node manages its own clock and its own synchronisation metadata (the vector clocks of its objects). Any pair of nodes can synchronise with each other without having to contact other nodes. There is no need for a central coordinator.

It does not constrain the topology. Synchronisation can be performed across arbitrary subsets (usually pairs) of nodes. Of course, who can do the most can do the least, so "star" topologies are supported but more complex topologies are supported as well.

It achieves "eventual consistency". If the conflict handling rule is consistent throughout the system, all nodes will reach the same state if modification of the data is stopped and enough synchronisation passes are run ("enough" depends on the topology).

It is robust. If a node is restored to a previous state, it will not disturb the synchronisation process and it will catch up with the other nodes (actually, if the node had been synchronised after the restore point, changes that occurred between the restore point and the last synchronisation will be recovered when synchronising after restoring the node). Of course this assumes that the synchronisation metadata (the vector clocks) are backed up together with the data.

1.2 Tick Management

In the description of the vector clock algorithm above, the tick is incremented every time an object is modified. This is actually not a requirement and the algorithm works just as well if the tick is incremented every time a synchronisation pass is run rather than every time an object is modified. So, the nodes can use either strategy to manage their clocks.

To be precise, and to get the same algorithm for the two strategies, the clock must actually be managed as follows:
  Incremented immediately "after" O is modified (O's vector clock contains the value "before" it was incremented).
  Or alternatively, incremented at the "beginning" of the synchronisation pass (so that objects aren't missed if the pass scans several objects and if objects are modified while the synchronisation pass is running).

With this convention, the tick can be interpreted as the "first value that has not been synchronised" rather than the "last value that has been synchronised" when the synchronisation pass is run. This may not be the most natural convention but it makes the algorithm work regardless of whether the tick is incremented at modification time or at synchronisation time.

1.3 Conflict Resolution

The algorithm uses a simple mechanism based on priorities and timestamps to resolve conflicts. The idea is the following:

Every node is given a "conflict priority". Usually, the priorities will be rather static but the scheme also supports scenarios where the priorities are modified dynamically while the system runs. The node with the smallest priority value wins.

If the conflict occurs between nodes of equal priority, the modification timestamp of the object is used to solve the conflict. The node where the object was last modified wins.

In the very improbable case where the modification timestamps are equal, some arbitrary rule is applied (smallest node id wins for example).

The conflict resolution can be optionally implemented by adding a priority value to the vector clock pairs. The vector clock is now a list of triplets (Ni, Ti, Pi) where Ni is the node id, Ti is Ni's tick when O was last modified at Ni, and Pi is Ni's conflict priority. Also, the synchronisation metadata should contain the last modification timestamp of each object. So, the synchronisation metadata for object O is the combination of its extended vector clock (list of triplets) and its last modification timestamp.

The conflict resolution algorithm works as described in the following table (the timestamp is reduced to hh:mm to keep table clean):

| Case | Example | Winner | Description |
|---|---|---|---|
| Priorities differ (static) | VO1 = (N1 6 1)(N2 7 2)(N3 9 3)<br>10:23<br>VO2 = (N1 5 1)(N2 8 2)(N3 8 3)<br>10:25 | VO1 | Conflict involves N1, N2 and N3. N1 has lowest conflict priority (1) and VO1 is the most recent version for N1 |
| Priorities differ (dynamic) | VO1 = (N1 6 1)(N2 7 2)(N3 9 3)<br>10:23<br>VO2 = (N1 5 3)(N2 8 2)(N3 8 3)<br>10:25 | VO1 | Conflict involves N1, N2 and N3. The N1 priority changed (from 3 to 1 when tick changed from 5 to 6). In this case we use the most recent priority for N1. So N1 has lowest conflict priority (1) and VO1 wins. |
| Priorities are equal | VO1 = (N1 6 1)(N2 7 1)(N3 9 3)<br>10:23<br>VO2 = (N1 5 3)(N2 8 1)(N3 8 3)<br>10:25 | VO2 | Conflict involves N1, N2 and N2. N1 and N3 both have lowest priority (1). So we use timestamps to resolve the tie. VO2 wins. Note: the fact that N1's priority is dynamic in the example does not matter, only the most recent priority is used |

1.4 Digest

Usually sets of objects (tables) rather than individual objects (records) are synchronised. So, the scheme uses a variant of the algorithm in which the nodes track the vector clocks at the "set" level rather than at the "object" level.

At the object level, the scheme's algorithm only tracks the last modification: a single (Ni, Ti) pair+last modification timestamp.

This is less expensive and easier to implement because the synchronisation metadata can be stored directly into the data table (only 3 additional columns for node id, tick and timestamp—are needed and often the timestamp column will already be there), or it can be stored in a separate syncdata table with a simple 1 to 1 join to the data table.

The "set" level vector clock is called "digest" in the scheme's terminology. The scheme's digest is actually an "extended" vector clock made of triplets (node id, tick, conflict priority).

This variant assumes that synchronisation is performed one set at a time rather than one object at a time (although it is shown later that it can also be used to propagate changes on individual objects, under certain conditions).

The digest of a node can also be interpreted as a "summary" of the synchronisation states of all the objects of the set at that node. For example, if the digest for set S is (N1 6 1)(N2 7 2)(N3 9 3) at node N1, this means that N1's S set has been synchronised with N2's S set at tick 7 (N1's state takes into account all changes made on N2 with tick <7) and with N3's S set at tick 9 (N1's state takes into account all changes made on N3 with tick <9)

Synchronisation now relies on the following principles:

A set may have different digests at different nodes. The goal of the synchronisation system is to bring the set in synchronisation across nodes. When a set is fully synchronised, its digest is the same on all nodes.

By comparing the digests of a given set on two nodes, the synchronisation algorithm can select the objects that need to be synchronised in both directions (see 1.5 below)

The algorithm does not have complete vector clocks at the object level but it has 4 pieces of information at hand when it synchronises an object: the two digests+the two object level triplets. This is sufficient to detect and resolve conflicts (see 1.6)

1.5 Selecting the Objects

The scheme uses two passes to synchronise two nodes Nj and Nk: one pass to propagate Nj's changes to Nk and a second pass in the other direction to propagate Nk's changes to Nj.

The following table describes how the algorithm selects objects from N1 when synchronising from N1 to N2, and then selects objects from N2 when synchronising in the other direction.

| Direction | Node | Digest Before | Digest After | Select clause | Comments |
|---|---|---|---|---|---|
| N1 -> N2 | N1 | (N1 6 1) (N2 7 2) (N3 9 3) | (N1 6 1) (N2 7 2) (N3 9 3) | SELECT * FROM N1.K WHERE (node = N1 and tick in [5, 6[) or (node = N3 and tick in [8, 9[) | The selection criteria only takes into account the pairs that have a higher tick on N1. For these pairs, the N2 tick is the selection threshold. |
|  | N2 | (N1 5 1) (N2 8 2) (N3 8 3) | (N1 6 1) (N2 8 2) (N3 9 3) |  |  |
| N2 -> N1 | N1 | (N1 6 1) (N2 7 2) (N3 9 3) | (N1 6 1) (N2 8 2) (N3 9 3) | SELECT * FROM N2.K WHERE (node = N2 and tick in [7, 8[) | Same as above, reversing the roles of N1 and N2. The digests are equal at the end of the operation. |
|  | N2 | (N1 6 1) (N2 8 2) (N3 9 3) | (N1 6 1) (N2 8 2) (N3 9 3) |  |  |

1.6 Conflict Detection with Digest

Conflict detection is slightly more complex than in the original algorithm (see 1.1) because the individual objects do not hold a complete vector clock, they only hold one pair. But conflicts can still be detected reliably because 4 pieces of information are at hand when an object is synchronised: the (Nj, Tj) pairs of the object on both sides but also the vector clocks of the sets on both sides. Conflict detection works as follows:

1. First, the pairs of the objects on both sides are compared. If they carry the same node id, there is no conflict and the object that has the highest tick is the most recent.

2. If the object pairs have different node ids, the object pair on one side is compared with the digest on the other side. If the tick attached to the object is strictly less than the corresponding tick in the other side's digest, there is no conflict and the digest side has the latest version. Otherwise a decision on the conflict cannot yet be made.

3. If the previous test did not succeed, the same test is done again in the other direction (the other object is compared with the other digest). Again, if the tick attached to the object is strictly less than the corresponding tick in the digest, there is no conflict and the digest side has the latest version.

4. If the previous tests failed, there is a conflict.

This algorithm works on some examples as shown below (synchronising from N1 to N2):

| | N1 | | N2 | | | |
|---|---|---|---|---|---|---|
| Case | Object | Digest | Object | Digest | Result | Comments |
| a | (N1 5) | (N1 6 1) (N2 7 2) (N3 9 3) | (N1 4) | (N1 5 1) (N2 8 2) (N3 8 3) | No conflict. N1 is more recent | Case 1: The pairs have the same node id. |
| b | (N1 5) | (N1 6 1) (N2 7 2) (N3 9 3) | (N2 6) | (N1 5 1) (N2 8 2) (N3 8 3) | No conflict N1 is more recent | Case 2 or 3 (depending how we start): pair on N2 side is strictly less than corresponding pair in digest on N1 side. |
| c | (N1 5) | (N1 6 1) (N2 7 2) (N3 9 3) | (N2 7) | (N1 5 1) (N2 8 2) (N3 8 3) | Conflict N1 wins because its conflict priority (1) is less than N2 (2). | Case 4: both cross comparisons between pair and digest failed. |
| d | (N1 5) | (N1 6 1) (N2 7 2) (N3 9 3) | (N3 7) | (N1 5 1) (N2 8 2) (N3 8 3) | No conflict N1 is more recent | Case 2 or 3: pair on N2 side is strictly less than corresponding pair in digest on N1 side. |
| e | (N3 8) | (N1 6 1) (N2 7 2) (N3 9 3) | (N2 7) | (N1 5 1) (N2 8 2) (N3 8 3) | Conflict N1 wins because its conflict priority (1) is less than N3 (3) | Case 4: both cross comparisons between pair and digest failed. |

Scenarios are given below that would lead to the cases above and that justify the results given in the table:
a) The object was modified on N1 at tick 4 and then synchronised to N2. Later the object was modified on N1 at tick 5 but it is known that it has not been modified on N2 because it is still tagged with (N1 4) on the N2 side. So there is no conflict and the N1 version 5 needs to be propagated to N2.
b) The object was modified on N2 at tick 6. This modification has been propagated to N1 (this is known because N1's digest contains (N2 7 2)). Afterwards, the object has been modified on N1 at tick 5. So there is no conflict and the N1 version 5 needs to be propagated to N2.
c) The object was modified on N1 at tick 5. This change has not been propagated to N2 before because N2's digest contains (N1 5 1). Similarly, the object was modified on N2 at tick 7 and this change has not been propagated to N1 because N1's digest contains (N2 7 2). So there is a conflict because the two changes have been done independently.
d) The object was modified on N3 at version 7 and then synchronised to N2 and N1 (it is not known in which order nor through which path but it is known that this synchronisation happened because of the digest entries for N3). The object was then modified on N1 at tick 5. There is no conflict and N1's version is more recent because it is known that version (N3 7) had been propagated to N1 before.
e) The object was modified on N3 at version 8. This change has been propagated to N1 but not to N2 (this is known from N3's tick in the two digests). The object was also modified on N2 at version 7 and this change has not been propagated to N1 (this is known because N1's digest contains (N2 7 2)). So there is conflict because the object has been modified independently on two nodes (N3 and N2).

2 Architecture
2.1 Preamble

The previous section describes a synchronisation algorithm in the abstract. It does not put many constraints on the actual architecture in which this algorithm will be deployed. For example it does not say whether the synchronisation passes are run from one of the nodes or externally to the nodes. If run from one of the nodes, it does not say whether all passes are run from the same node, or whether passes may be run from different nodes. It does not say either how the data is accessed: direct connection to the databases (classical C/S architecture), service interface (SOAP or REST (Representational state transfer)), or others The algorithm could be deployed in a variety of ways (external/internal process, single/multiple processes, CS/SOA (service oriented architecture), etc). In this second section, an example of a possible deployment is given.

2.2 Terminology Adjustments

A specific implementation of the scheme is described below, which is the specification of a REST protocol for the applicant's applications.

It is necessary to adapt the terminology used in the previous section to terminology used for this implementation example. The following table gives the mapping:

| Algorithm | Example implementation |
|---|---|
| object | resource |
| set | entity |
| node | endpoint |
| tick | tick |
| digest | digest |

It would have been possible to use the implementation example terminology in the previous section. This was not done to stress the point that the algorithm is independent from the architecture, so that it can be reviewed and discussed independently from the architecture.

2.3 Endpoint

The mapping between node and endpoint in the previous table needs additional explanation. When the algorithm was described, the nature of a node was kept vague: a node identifies a location and, for example, a node could manage several sets.

On the implementation side, a slightly restrictive approach is taken: an endpoint represents one set at one location (one entity in a given service provider) rather than the location itself (the service provider). So, an endpoint is actually an entity URL in a given service provider. This more restrictive interpretation of "node" does not have any impact on the algorithm: if the algorithm works for a node that manages several sets, it also works for the simpler case where a node manages a single set.

The following table gives examples of endpoints: As the table shows, endpoint URLs may include filters. This feature should be used with care. To be on the safe side, filters should always create a partition of the entity (for example one endpoint per country) so that the sets behind two endpoints of the same provider do not overlap. If the filters overlap conflict detection may generate false positives.

| Endpoint | Description |
| --- | --- |
| http://sdata.acme.com/sdata/app1/test/accounts | Entity "accounts" in service provider http://sdata.acme.com/sdata/app1/test |
| http://sdata.acme.com/sdata/app2/test/accounts | Same entity (accounts) in a different provider (app2) |
| http://sdata.acme.com/sdata/app1/test/products | Different entity (products) in the same provider (app1) |
| http://sdata.acme.com/sdata/app1/test/accounts?where=country eq 'UK' | Filters can be used in endpoint URLs. Different filters are treated as different endpoints. |

2.4 Engine

In the implemented synchronisation architecture, the endpoints are the entry doors into the applications, they are the URLs that a synchronisation "engine" uses to read and write from the application.

The processes that exchange data between applications to bring them in synchronisation are run by components called "synchronisation engines".

The implemented architecture is very flexible on the engine side. It supports centralised scenarios in which a central engine drives all the interactions as well as decentralised scenarios where several engines cooperate. This point is developed in 2.9 below.

2.5 Messages

A synchronisation engine interacts with an application through the endpoints (URLs) that the application exposes. The engine uses only three types of messages to communicate with the applications, as described in the following table, where Atom refers to an XML language used for web feeds:

| Message Type | URLs | Format | Description |
| --- | --- | --- | --- |
| Digest | endpoint/$syncDigest | Atom entry containing digest payload | This message is a simple Atom entry containing the digest. The engine uses it to read digests from endpoints |
| Delta Feed | endpoint/$syncSource endpoint/$syncTarget | Atom feed with example implementation batch and synchronisation extensions. | This is the main synchronisation message. It is used to transfer the resources that have been modified from one endpoint to another. The message is an atom feed containing implementation batching and synchronisation extensions.. |
| Diagnosis | diagnosis URL | Atom feed with example implementation diagnosis payload | This message is used to report errors and warnings to a component that logs them so that the user can review and act on them. This implementation doesn't impose a URL here because different integration scenarios have different requirements on error reporting. Instead, the diagnostic URL should be configured before running a synchronisation pass. |

2.6 Process

Figure 1:
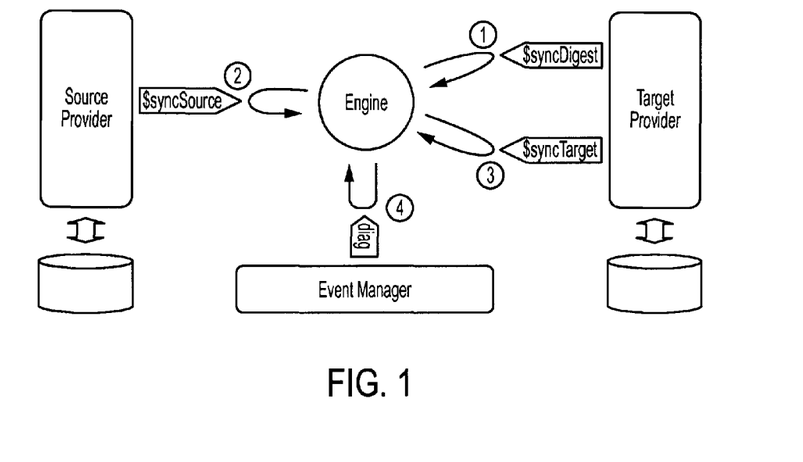
FIG. 1 is a schematic view of a system for synchronising a number of data stores.

Generally, FIG. 1 shows how components interact with each other in a synchronisation pass. The process involves 4 steps numbered 1 to 4. All steps are initiated by the synchronisation engine and this figure shows the most general case where the source application, the target application, the engine and the event logger are distinct components that may eventually reside on different computers.

The process unfolds as follows:
At 1. the engine gets the target digest.
At 2 the engine sends the target digest to the source. The source uses the two digests (its own and the target one) to select the resources that need to be transferred to the target (it uses the algorithm described in 1.5). The source returns the delta feed to the engine.

At 3 the engine sends the delta feed to the target. The delta feed is a batch of create/update/delete instructions that the target provider executes to bring its data store in synchronisation. The delta feed also contains the two digests that have been used to select resources on the source side. The target uses these digests to detect and resolve conflicts (it uses the algorithm described in 1.6). When the batch has been fully processed, the target updates its digest to reflect the fact that the delta has been applied. The target returns diagnostic information about the success/failure of the operations that have been submitted.

At 4 the engine sends the diagnostics that it just received to the event manager. The event manager logs them and alerts users if configured to do so.

The delta is a feed which is broken in pages (using the implementation example paging protocol). So the engine repeats steps 2, 3 and 4 on every page of the feed. At step 3, the target digest is only updated at the end of the last page (this operation could have been done as a separate step #5 to clearly isolate the loop in steps 2, 3 and 4 but then the engine would make an extra roundtrip to the target).

2.7 Observations

This architecture has some interesting properties:

All the communications are based on HTTP and URLs. As a result, the engine can be run from anywhere, as long as it can access the URLs (the engine is a service consumer that connects to several providers).

The intelligence is in the endpoints and the messages, not in the engine. The engine is just a simple process that passes messages around. It needs to know the URLs of the 3 participants (source, target and event manager) but it only needs to know very little about the messages that are exchanged (it just needs to detect the end of the batch to stop its loop). Implementing an engine is a rather trivial task (the same cannot be said of endpoints).

The engine is stateless. It can be packaged as a simple object that gets instantiated at the beginning of every pass. The URLs must be configured before starting the synchronisation pass. Once the pass has been completed, the engine object can be deleted. So, the engine is not tied to a particular location and the synchronisation passes can be run from different places. All that is required is that the engine knows the URLs and this rather a configuration/repository issue than a synchronisation issue per se.

2.8 Simplified Deployments

The deployment can be simplified by embedding the engine into one of the endpoints. In this case, the communications between the engine and its embedding endpoint can be short-circuited (they are not required to go through HTTP and URLs). For example, if the engine is run from the source application and if the source also handles the diagnostics, FIG. 1 becomes the set up shown in FIG. 2, in which the numerals relate to the same functions mentioned above in relation to FIG. 1.

Figure 2:
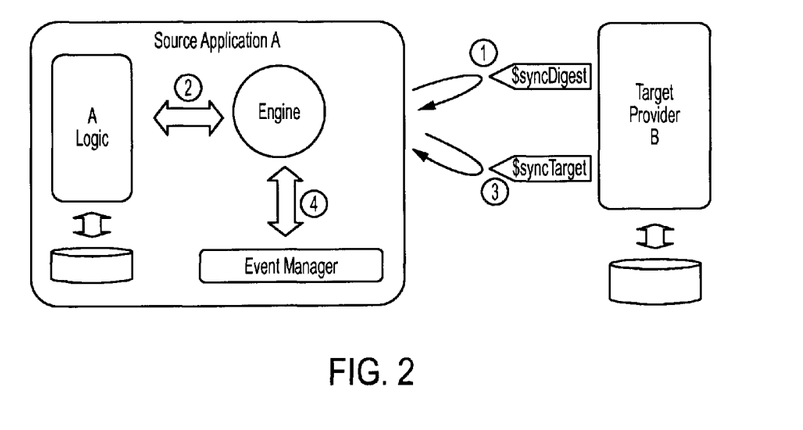
FIG. 2 is a schematic view of a an alternative arrangement of the system shown in FIG. 1, in which a synchronisation engine is embedded in a node.

FIG. 2 shows a simplified deployment of the synchronisation protocol. In this configuration, the engine and the event logger are embedded in the source application. The architecture is reduced to two components: a source application that drives synchronisation passes and a target application that responds to synchronisation requests. Synchronisation is limited to one direction: changes are propagated from source to target but not from target to source.

In this simplified architecture the source is not a service provider any more, it has become an application that consumes services exposed by another application.

If bi-directional synchronisation is needed between the two applications, we can still use the same simplified architecture. To synchronise in the other direction, FIG. 3 shows the architecture, in which again the numerals relate to the same functions mentioned above in relation to FIG. 1.

Figure 3:
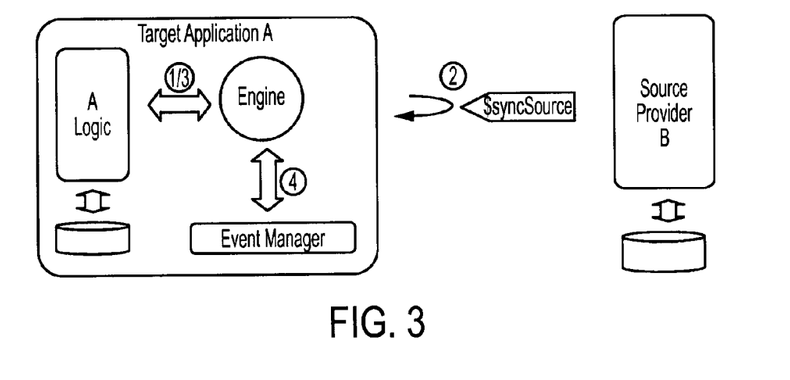
FIG. 3 is a schematic view of the same architecture as FIG. 2, but with source and target reversed.

FIG. 3 is similar to FIG. 2, with source and target roles reversed. Like in FIG. 2, synchronisation is limited to one direction but this time the synchronisation engine is on the target side and is pulling the changes from a remote source, whereas it was on the source side and pushing changes to a remote target in FIG. 2.

Figure 4:
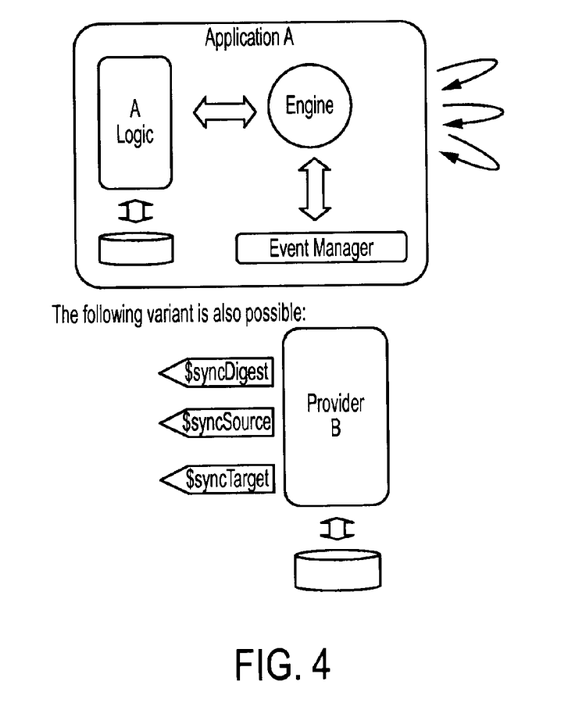
FIG. 4 is a schematic view of a system for bidirectional synchronisation of a number of data stores.

FIG. 4 shows the simplified bi directional architecture obtained by combining FIGS. 2 and 3. This is a typical "synchronisation hub" configuration where we have a central hub (application A) that runs the engine, manages the event log and synchronises with a satellite (provider B). The figure only shows one satellite but there could be several. In this configuration, the hub orchestrates the synchronisation passes and the satellites are rather passive as they only respond to requests from the hub.

Figure 5:
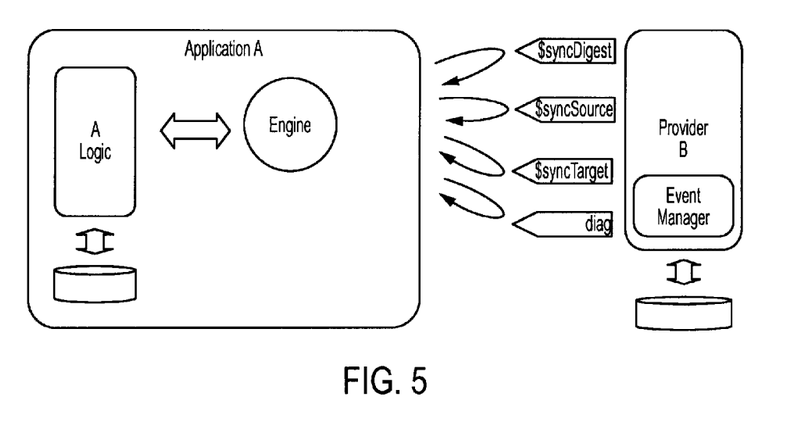
FIG. 5 is a schematic view of an architecture similar to that of FIG. 4, but with an event manager located in the Provider B.

FIG. 5 shows a typical disconnected laptop scenario. The roles are reversed from FIG. 4. The server (hub) is provider B and the laptop (satellite) is application A. The synchronisation engine is run from the laptop when it can establish a connection to the server. The event log is centralised on the server. This figure only shows one laptop but the architecture would allow any number of laptops.

2.9 Other Deployment Scenarios

The "simplification exercise" above shows that implementation example synchronisation can accommodate both a "suite" scenario where a central engine coordinates synchronisation passes between services and a "disconnected laptop" scenario where each laptop runs its own synchronisation engine.

But the architecture allows many more variants because all the interactions go through URLs and the location of the components is not of great significance (all that is required is that the engine can access the other component's URLs). Flexibility is particularly important on the error reporting side, and nothing prevents the engine from sending the diagnoses to more than one diagnostic endpoint. In the context of an application suite, this is usually not required because the suite has a central event management facility, but when the applications do not belong to a suite, the implementation example allows the system to be configured to report errors in one of the applications, or in the other, or in both, or sometimes in one sometimes in the other (depending on the direction for example). This decision should be dictated by product considerations and the implementation example architecture should be able to accommodate the various needs of product integration scenarios.

2.10 Immediate and Catch-Up Synchronisation

The engine described above works in "catch up" mode. Synchronisation is done in passes, which may be run by a scheduler or launched manually. The synchronisation passes use the following logic:

Read the target digest

Query the delta from the source (target digest is passed as input because the source needs it to compute the delta).

Apply the delta to the target (which will resolve conflicts and update its digest at the end).

Log success/failure

In a number of scenarios, it is important to propagate changes as soon as possible instead of having to wait for a synchronisation pass. This "immediate" mode involves a slightly different process:

Detect that a resource has changed on the source side.

Prepare a delta that represents the change.

Apply the delta to the target.

Log success/failure.

The implementation example synchronisation protocol is designed to handle the two modes under a common protocol. Of course, the source implementation will be different in the two modes (in catch-up mode, the source needs to provide an entry point to query the delta, in immediate mode, the source needs to be able to detect changes), but the protocol is designed so that the target side can handle both modes in a uniform way (the target does not need to be aware of which mode is used).

Also, the implementation example synchronisation protocol is designed to support a mix of the two modes. This feature is important because the immediate mode is challenging. For example, one of the applications may be offline or the target application may be down when the source tries to propagate changes. This can be solved by introducing a queue to guarantee delivery but this has drawbacks (queue needs to remain active if source application is closed, queue may end up wasting lots of resources, especially is a target is never reachable, etc.). An alternative is to consider that the immediate mode is only a "best effort" to propagate changes, and to use the "catch up" mode to ensure that systems will be brought back in synchronisation periodically even if some immediate synchronisation requests have been lost.

Figure 6:
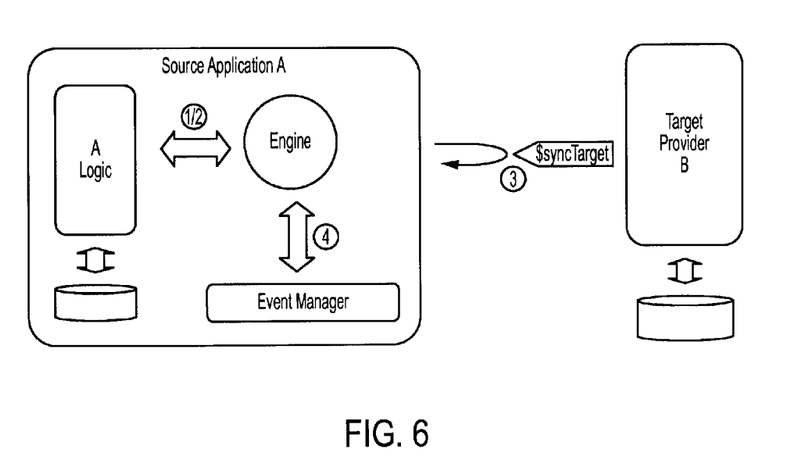
FIG. 6 is a schematic view showing an example architecture for an immediate mode synchronisation.
Figure 7:
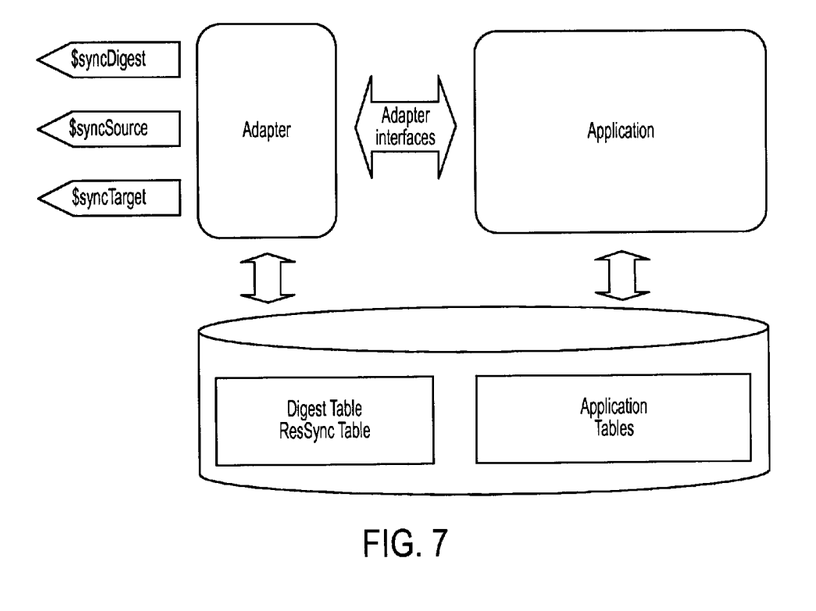
FIG. 7 is a schematic view of a further synchronisation architecture.

In immediate mode, the architecture is typically as shown in FIG. 6, which shows a typical configuration for immediate synchronisation. The source application pushes its changes to a target application. The main difference with the catch up mode is the elimination of a roundtrip to query the target digest. This configuration is more efficient to propagate changes than the catch up configuration depicted in FIG. 2 but a real system would probably combine both configurations so that it can revert to catch up mode when the immediate mode fails.

The main difference with the catch up mode is that the engine does not read the target digest any more (this would involve an extra roundtrip), it only pushes the delta to the target.

The implementation example protocol handles the immediate mode and the mix of modes by using a "rich" (selfdescribing) delta message. The implementation example delta message contains:

A batch of actions to create/update/delete resources.
The synchronisation metadata for the individual resources in the batch (endpoint+tick+modification timestamp triplet).
The two digests that have been used to generate the batch.

The process is to include two digests that delimit the delta (change) in the feed. These two digests are called the "floor" and "ceiling" digests. They are set as follows:

In the "catch up" case, the floor digest is simply the target digest and the ceiling digest is the source digest. This combination corresponds to the criteria used to select resources on the source side (see 1.5) (in other terms, the source side has this version of the object but the target side has not seen it yet).

In the "immediate" case, the floor digest is the source digest before the resource was modified and the ceiling digest is the source digest after the resource was modified (same as floor but the tick for the source endpoint is incremented by 1).

With this refinement, the target knows precisely what the delta contains. The target checks if the tick intervals defined by the floor and ceiling are contiguous to its own tick values (the target digest). If the intervals are contiguous, the target can update its digest. Otherwise, if there is a gap between the tick interval defined by floor/digest and the target digest, the target knows that at least one immediate synchronisation has been missed and it does not update its digest. The next catch up synchronisation will close the gap.

The rationale for having two digests in the message is to make the feeds more "self describing". They do not contain only the changes; they also contain information about the two digests that bracket the changes. This is useful in immediate mode because it allows the target to check if the range of changes sent by the source is contiguous with the changes that have already been incorporated on the target. If the range of changes is contiguous, the target can incorporate them and update its digest. If they are not (this happens if a previous immediate synchronisation message has not been delivered to the target), the target should discard the request.

The implementation protocol is designed so that the target side can handle the catch up mode and the immediate mode with the same logic. This is why the same message (feed) is used for both modes, with two digests in the message. This make the protocol more robust (for example in the unlikely scenario where the target node is restored from an old backup between the time the source queried its digest and the time the source sends its changes).

The following table shows how this algorithm works.

| Floor | Ceiling | Target | New Target | Comments |
|---|---|---|---|---|
| (N1 6 1) (N2 7 2) (N3 9 3) | (N1 7 1) (N2 7 2) (N3 9 3) | (N1 6 1) (N2 9 2) (N3 8 3) | (N1 7 1) (N2 9 2) (N3 8 3) | N1 propagates a change to N2 in immediate mode. So, floor and ceiling only differ on N1 (see above). The floor tick for N1 (6) matches the target tick for N1 (6). So the target knows that it had received all versions from N1 up to tick 6 before and that it is now receiving changes between 6 and 7 from N1, so it now has all versions from N1 up to tick 7. The target can update N1's tick to 7 in its digest. |
| (N1 7 1) (N2 7 2) (N3 9 3) | (N1 8 1) (N2 7 2) (N3 9 3) | (N1 7 1) (N2 9 2) (N3 8 3) | | N1 propagates a second change to N2 in immediate mode, at a time where N2 is offline. This message does not reach the target. So nothing happens and the target digest is not updated. |
| (N1 8 1) (N2 7 2) (N3 9 3) | (N1 9 1) (N2 7 2) (N3 9 3) | (N1 7 1) (N2 9 2) (N3 8 3) | (N1 7 1) (N2 9 2) (N3 8 3) | N1 propagates a third change to N2 in immediate mode (we assume that N2 is back online). The floor tick for N1 (8) does not match the target tick for N1 (7). The target cannot update its digest tick for N1 because it did not receive the changes between ticks 7 and 8. |
| (N1 7 1) (N2 9 2) (N3 8 3) | (N1 10 1) (N2 7 2) (N3 9 3) | (N1 7 1) (N2 9 2) (N3 8 3) | (N1 10 1) (N2 9 2) (N3 9 3) | A catch up pass is run from N1 to N2. In catch up mode, the floor digest is the target digest and the ceiling digest is the source digest (see above). So this pass selects the resources that have N1 ticks between 7 and 10 or N3 ticks between 8 and 9. The tick intervals that the target receives are adjacent to the tick intervals that it had before (this is always true in catch up mode because floor and target digests are identical). So, the target can set its N1 tick to 10 and its N3 tick to 9 at the end of this synchronisation pass. The anomaly is resolved. Note: The N2 tick is 7 at the source and 9 at the target at the end of this pass. This is not an anomaly. Another synchronisation pass in the other direction is needed to bring the N2 tick on par. |

Summary

The scheme described above allows for an advantageous reduction in the data that is appended to each record or object, because only a last node/tick pair is added, with the remainder of the clock vector being sent with the digest. The scheme allows the same efficiency and conflict detection as existing schemes, but with much reduced overhead.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of synchronising at least first and second instances of an information set comprising a plurality of entries, wherein said at least first and second instances are located on different nodes of a system, the method comprising:
    attaching a single node value and current logical clock value pair to, in a case in which there is no previously-attached single node value and logical clock value pair, and in a case in which there is a single node value and current logical clock value pair that was previously attached, replacing the previous single node value and logical clock value pair with a new single node value and current logical clock value pair for, each particular entry of the plurality of entries in the information set of a given instance when said each particular entry in the given instance is changed;
    generating respective digests, distinct from the node value and current logical clock value pairs corresponding to particular entries and distinct from the entries, for each of the at least first and second instances of the information set, wherein said digests comprise logical clock information of a last synchronisation event of one of the at least first and second instances of the information set with each of the other at least first and second instances of the information set; and
    synchronising the at least first and second instances of the information set by comparing the digests and reconciling the at least first and second instances on an entry-by-entry basis,
    wherein the synchronising is performed in a bi-directional manner between two of the at least two instances of the information set, wherein at least one entry of one instance of the information set being synchronised is updated based on a corresponding entry of the other instance of the information set being synchronised, and wherein at least one entry of the other instance of the information set being synchronised is updated based on a corresponding entry of the one instance of the information set being synchronized;
    wherein an entry for a respective node in the digest comprises a node value and logical clock value pair for the node of the system; and
    wherein an entry for a respective node in the digest additionally includes a conflict priority value for the node of the system.

2. The method of claim 1, wherein a timestamp value is attached to each data entry when said entry is changed, in addition to the node value and current logical clock value pair.

3. The method of claim 1, wherein the synchronisation is performed for one information set at a time.

4. The method of claim 1, wherein each digest is located at a node to which it relates.

5. The method of claim 1, wherein the node value and current logical clock value pair and/or the digest are carried by a syndication feed.

6. The method of claim 1, wherein the node values are URLs.

7. The method of claim 1, wherein two digests are provided for each synchronisation event.

8. The method of claim 7, wherein the two digests relate to a state of one of the nodes before a modification event and after a modification event respectively.

9. A synchronisation device operable to perform the method of claim 1.

10. The synchronisation device of claim 9, which is an application running on a computer system.

11. The method of claim 1, wherein the synchronising is performed by an automated synchronisation process, including any necessary conflict resolution, without user intervention.

12. A computing system comprising a plurality of nodes, wherein each node incorporates an instance of an information set including a plurality of entries, the computing system being operable to synchronise the instances of the information set, and comprising at least one synchronisation logic element operable to:
    attach a single node value and current logical clock value pair to, in a case in which there is no previously-attached single node value and logical clock value pair, and in a case in which there is a single node value and current logical clock value pair that was previously attached, replace the previously attached single node value and logical clock value pair with a new single node value and current logical clock value pair for, each particular entry of the plurality of entries in the information set of a given instance when said each particular entry in the given instance is changed;
    generate a respective digest, distinct from the node value and current logical clock value pairs corresponding to particular entries and distinct from the entries, for each of the instances of the information set, wherein said digests comprise logical clock information of a last synchronisation event of one of the instances of the information set with each of the other instances of the information set; and
    synchronise the instances of the information set by comparing the digests and reconciling the at least first and second instances on an entry-by-entry basis,
    wherein synchronisation is performed in a bi-directional manner between two of the at least two instances of the information set, wherein at least one entry of one instance of the information set being synchronised is updated based on a corresponding entry of the other instance of the information set being synchronised, and wherein at least one entry of the other instance of the information set being synchronised is updated based on a corresponding entry of the one instance of the information set being synchronized;

wherein an entry for a respective node in the digest comprises a node value and logical clock value pair for the node of the system; and wherein an entry for a respective node in the digest additionally includes a conflict priority value for the node of the system.

13. The computing system of claim 12, wherein the synchronisation logic element comprises a synchronisation endpoint for each node or for each instance of the information set.

14. The computing system of claim 12, wherein the synchronisation logic element comprises one or more synchronisation engines operable to drive exchanges of messages between synchronisation endpoints.

15. The computing system of claim 14, wherein the synchronisation engines and synchronisation endpoints reside on different computers.

16. The computing system of claim 14 wherein a synchronisation engine may reside on the same computer as a synchronisation endpoint.

17. The computing system of claim 13, wherein each synchronisation endpoint is operable to perform the attaching and digest generation for its given node.

18. The computing system of claim 13, wherein the plurality of synchronisation engines are operable to communicate with the endpoints to perform the synchronisation function.

19. The computing system of claim 13, wherein the nodes are computer applications running on one computer.

20. The computing system of claim 13, wherein the nodes are computer applications running on different computers.

21. A computer program product comprising instructions, which when run on a computer are operable to implement a method of synchronising at least first and second instances of an information set comprising a plurality of entries, wherein said first and second instances are located on different nodes of a computer system, the method comprising:

attaching a single node value and current logical clock value pair to, in a case in which there is no previously-attached single node value and logical clock value pair, and in a case in which there is a previously-attached single node value and logical clock value pair, replacing the previously-attached single node value and logical clock value pair with a new single node value and current logical clock value pair for, each particular entry of the plurality of entries in the information set of a given instance when said each particular entry in the given instance is changed;

generating a respective digest, distinct from the node value and current logical clock value pairs corresponding to particular entries and distinct from the entries, for the given instance of the information set, wherein said digest comprises logical clock information of a last synchronisation event of the given instance of the information set with each of the other at least first and second instances of the information set; and synchronising the given instance of the information set with the other one of the at least first and second instances of the information set by comparing digests of the instances and reconciling the instances on an entry-by-entry basis, wherein the synchronising is performed in a bi-directional manner between two of the at least two instances of the information set, wherein at least one entry of one instance of the information set being synchronised is updated based on a corresponding entry of the other instance of the information set being synchronised, and wherein at least one entry of the other instance of the information set being synchronised is updated based on a corresponding entry of the one instance of the information set being synchronized;

wherein an entry for a respective node in the digest comprises a node value and logical clock value pair for the node of the system;

wherein an entry for a respective node in the digest additionally includes a conflict priority value for the node of the system.

* * * * *